United States Patent
Block et al.

(10) Patent No.: US 7,281,052 B2
(45) Date of Patent: Oct. 9, 2007

(54) DATA TRACING IDENTIFIERS

(75) Inventors: Timothy Roy Block, Rochester, MN (US); Robert Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 10/020,382

(22) Filed: Dec. 14, 2001

(65) Prior Publication Data

US 2003/0115356 A1   Jun. 19, 2003

(51) Int. Cl.
*G06F 15/16* (2006.01)
*G06F 15/173* (2006.01)

(52) U.S. Cl. ............... 709/230; 709/236; 709/246; 370/465; 370/471; 370/474

(58) Field of Classification Search ........... 709/230, 709/236, 246; 370/465, 471, 474
See application file for complete search history.

(56) References Cited

U.S. PATENT DOCUMENTS

| 6,091,733 | A  |   | 7/2000  | Takagi et al. |            |
|-----------|----|---|---------|---------------|------------|
| 6,134,243 | A  | * | 10/2000 | Jones et al.  | 370/465    |
| 6,233,224 | B1 |   | 5/2001  | Yamashita et al. |         |
| 6,453,355 | B1 | * | 9/2002  | Jones et al.  | 709/230    |
| 6,512,778 | B1 | * | 1/2003  | Jones et al.  | 370/465    |
| 6,538,997 | B1 | * | 3/2003  | Wang et al.   | 370/241    |
| 6,744,763 | B1 | * | 6/2004  | Jones et al.  | 709/231    |

OTHER PUBLICATIONS

Li, Renqi et al. "Security Issues with TCP/IP". ACM SIGAPP Applied Computing Review. vol. 3, Issue 1. Summer 1995. ACM Press. pp. 6-13.*
Zinky, John et al. "Visualizing Packet Traces". Applications, Technologies, Architectures, and Protocols for Computer Communication. ACM Press. Baltimore, MD. 1992. pp. 293-304.*
Hays, Bill et al. "A Layered Networking Protocol Designed to Minimize Complexity." Proceedings of the 1988 ACM Sixteenth Annual Conference on Computer Science. ACM Press. Atlanta, GA. 1988. pp. 578-585.*
Iren, Sami. "The Transport Layer: Tutorial and Survey". ACM Computing Surveys. vol. 31, Issue 4. Dec. 1999. pp. 350-404. ACM Press.*
Chandranmenon, Girish et al. "Trading Packet Headers for Packet Processing." IEEE/ACM Transactions on Networking, vol. 4, No. 2, Apr. 1996. 141-152.*

* cited by examiner

*Primary Examiner*—Jason Cardone
*Assistant Examiner*—Jeffrey R Swearingen
(74) *Attorney, Agent, or Firm*—Patterson & Sheridan, LLP

(57) ABSTRACT

A method for assigning an identifier to data processed through protocol layers in one or more computers over a network. A space for the identifier is reserved in the header of each protocol layer. The identifier is then generated at one of the protocol layers. In an embodiment, the identifier is generated at the lowest protocol layer of a computer that sends the data, i.e., the sending computer. Once the identifier is generated, it is then stored in the reserved space in the header.

11 Claims, 4 Drawing Sheets

DATA TRACING IDENTIFIERS

BACKGROUND OF THE INVENTION

1. Field of the Invention

The present invention relates generally to computers and computer networks, and more particularly, to data communication protocols for processing information communicated between hosts such as computers connected to a network.

2. Description of the Related Art

The advantages of network computing are increasingly evident. The convenience and efficiency of providing information, communication or computational power to individuals at their personal computer or other end user devices has led to rapid growth of such network computing, including internet as well as intranet systems and applications.

As is well known, most network computer communication is accomplished with the aid of a layered software architecture for moving information between host computers connected to the network. The layers help to segregate information into manageable segments. The general functions of each layer may be based on a reference model—Open Systems Interconnection (OSI). OSI sets forth seven processing layers through which information may pass when received by a host in order to be presentable to an end user. Similarly, transmission of information from a host to the network may pass through those seven processing layers in reverse order. Each step of processing and service by a layer may include copying the processed information. Another reference model that is widely implemented, called TCP/IP (TCP stands for transport control protocol, while IP denotes Internet protocol) essentially employs five of the seven layers of OSI.

Networks may include, for instance, a high-speed bus such as an Ethernet connection or an Internet connection between disparate local area networks (LANs), each of which includes multiple hosts, or any of a variety of other known means for data transfer between hosts. According to the OSI standard, physical layers are connected to the network at respective hosts, the physical layers providing transmission and receipt of raw data bits via the network. A data link layer is serviced by the physical layer of each host, the data link layers providing frame division and error correction to the data received from the physical layers, as well as processing acknowledgment frames sent by the receiving host. A network layer of each host is serviced by respective data link layers, the network layers primarily controlling size and coordination of subnets of packets of data.

A transport layer is serviced by each network layer and a session layer is serviced by each transport layer within each host. Transport layers accept data from their respective session layers and split the data into smaller units for transmission to the other host's transport layer, which concatenates the data for presentation to respective presentation layers. Session layers allow for enhanced communication control between the hosts. Presentation layers are serviced by their respective session layers, the presentation layers translating between data semantics and syntax which may be peculiar to each host and standardized structures of data representation. Compression and/or encryption of data may also be accomplished at the presentation level. Application layers are serviced by respective presentation layers, the application layers translating between programs particular to individual hosts and standardized programs for presentation to either an application or an end user. The TCP/IP standard includes the lower four layers and application layers, but integrates the functions of session layers and presentation layers into adjacent layers. Generally speaking, application, presentation and session layers are defined as upper layers, while transport, network and data link layers are defined as lower layers.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, systems and programs commonly employed, each layer is necessary to insure that the data can make it to the intended destination in the appropriate form, regardless of variations in hardware and software that may intervene.

In preparing data for transmission from a first to a second host, some control data is added at each layer of the first host regarding the protocol of that layer, the control data being indistinguishable from the original (payload) data for all lower layers of that host. Thus, an application layer attaches an application header to the payload data and sends the combined data to the presentation layer of the sending host, which receives the combined data, operates on it and adds a presentation header to the data, resulting in another combined data packet. The data resulting from combination of payload data, application header and presentation header is then passed to the session layer, which performs required operations including attaching a session header to the data and presenting the resulting combination of data to the transport layer. This process continues as the information moves to lower layers, with a transport header, network header and data link header and trailer attached to the data at each of those layers, with each step typically including data moving and copying, before sending the data as bit packets over the network to the second host.

The receiving host generally performs the converse of the above described process, beginning with receiving the bits from the network, as headers are removed and data processed in order from the lowest (physical) layer to the highest (application) layer before transmission to a destination of the receiving host. Each layer of the receiving host recognizes and manipulates only the headers associated with that layer, since to that layer the higher layer control data is included with and indistinguishable from the payload data.

Due to the number of protocol layers through which the data is processed prior to its transmission as bit packets over the network, debugging the various protocol layers in the event that the data is not successfully transmitted is difficult, if not impossible. Many factors may have hindered the data from being successfully transmitted, e.g., one of the protocol layers may have erroneously discarded the data. This difficulty is further accentuated by the fact that the higher protocol layers have no knowledge of how data is processed at the lower protocol layers. Consequently, when data is lost, it is generally difficult to debug the process.

Therefore, there exists a need for a method that facilitates tracing the data as it is processed through the various protocol layers.

SUMMARY OF THE INVENTION

Embodiments of the present invention generally relate to methods for assigning an identifier to data processed through protocol layers in one or more computers over a network. Each protocol layer has a header. A space is reserved for the identifier in the header of each protocol layer. The identifier is then generated at one of the protocol layers. In one embodiment, the identifier is generated at the lowest protocol layer of a computer that sends the data, i.e., the sending computer. Once the identifier is generated, it is then stored in the reserved space in the header.

Another embodiment of the present invention relates to a method for sending data from one computer to another computer connected within a network. The first computer has one or more data communication protocol layers that correspond to one or more data communication protocol layers in the second computer. The one or more protocol layers include a first protocol layer and a second protocol layer. The method begins by attaching a header to the data at the first protocol layer of the first computer. A space in the first header is then reserved for an identifier. The data and the first header are then sent from the first protocol layer to the second protocol layer of the first computer. A second header is then attached to the data at the second protocol layer, and a space in the second header is reserved for the identifier. The identifier is generated at the second protocol layer and stored in the reserved space of the second header. Once the identifier is copied and sent from the second protocol layer to the first protocol layer, the identifier is stored in the reserved space of the first header. The data with the first header and the second header are then sent from the second protocol layer of the first computer to its corresponding second protocol layer of the second computer over the network. The second header is then removed from the data at the second protocol layer of the second computer. Once the identifier is copied from the reserved space in the second header to the reserved space in the first header, the data and the first header are sent from the second protocol layer of the second computer to the first protocol layer of the second computer. The first header is then removed from the data at the first protocol layer of the second computer.

Another embodiment of the present invention relates to a method for sending data from a computer to a network through one or more data communication protocol layers. The protocol layers include a first protocol layer and a second protocol layer. The method begins by attaching a first header to the data at the first protocol layer. A space in the first header is then reserved for an identifier. The data and the first header are sent from the first protocol layer to the second protocol layer. A second header is attached to the data at the second protocol layer, and a space in the second header is reserved for the identifier. The identifier is generated at the second protocol layer and stored in the reserved space of the second header. Once the identifier is copied and sent from the second protocol layer to the first protocol layer, the identifier is stored in the reserved space of the first header. The data with the first header and the second header are then sent to the network.

Another embodiment of the present invention relates to a method for receiving data by a computer from a network. The computer has one or more data communication protocol layers. The protocol layers include a first protocol layer and a second protocol layer. Each protocol layer has its own header. The second protocol layer is the lowest layer while the first protocol layer is the highest protocol layer. The method begins by receiving the data at the second protocol layer. The second header is removed from the data at the second protocol layer. The second header has an identifier, and the identifier is copied from the second header to the first header. The data and the first header are then sent from the second protocol layer to the first protocol layer. The first header is then removed from the data at the first protocol layer.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Generally, embodiments of the present invention relate to methods for assigning an identifier to data processed through protocol layers in one or more computers over a network. Each protocol layer has a header. To this end, a space is reserved for the identifier in the header of each protocol layer. The identifier is then generated at one of the protocol layers. Once the identifier is generated, it is then stored in the reserved space in the header.

Embodiments of the invention can be implemented as a program product for use with a computer system, such as, the network system 10 shown in FIG. 1 and described below. The program(s) of the program product defines functions of the embodiments (including the methods described below with reference FIGS. 3 and 4) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the embodiments of the present invention may be programmed into routines with subroutines and nested loops, including calls and returns of subroutines. Furthermore, the routines executed to implement the embodiments of the present invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
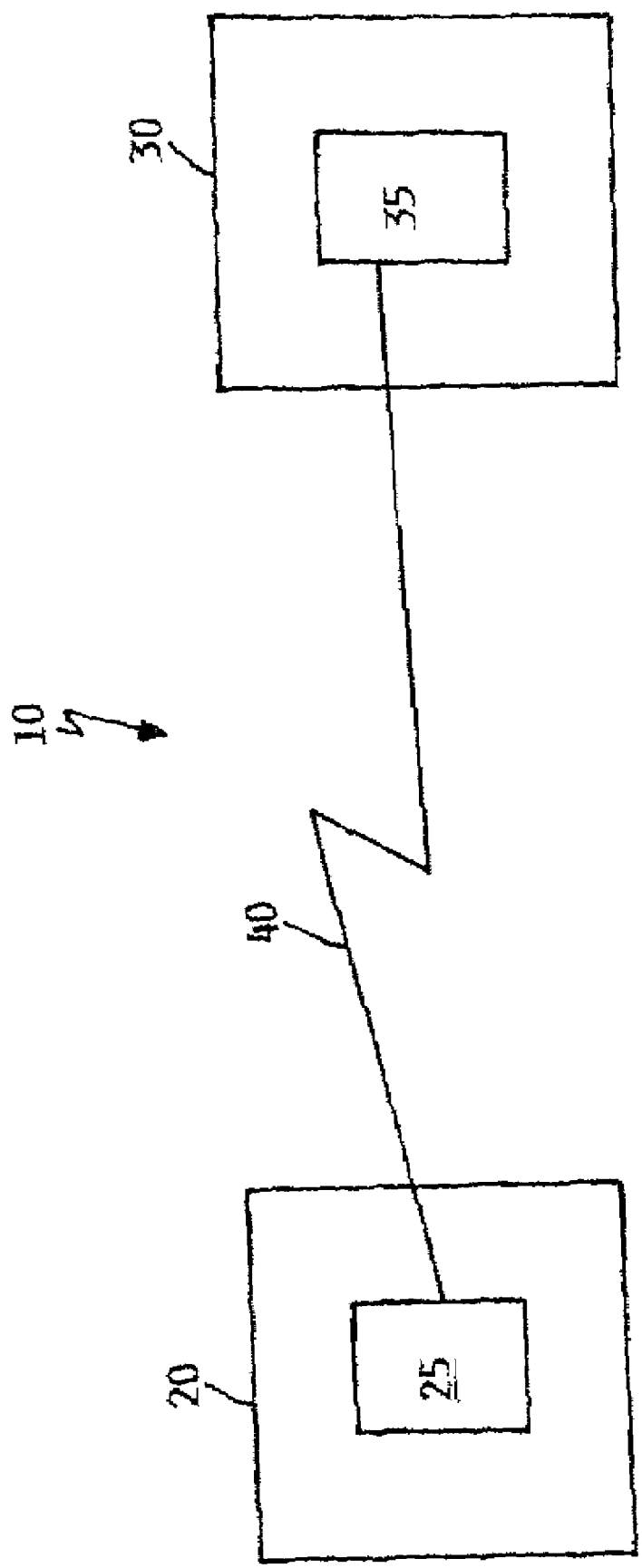
FIG. 1 is a block diagram illustrative of a network system.

Referring now to FIG. 1, a block diagram illustrative of a conventional network system 10 is shown in which aspects of the invention may be implemented. In the network system 10, a computer 20 is connected to another computer 30 over a network 40 so that the computer 20 may communicate with the computer 30. The network computer communication is facilitated by a layered software architecture for moving information between the computers connected to the network 40. Computer 20 therefore has a stack of protocol layers 25 that corresponds to the stack of protocol layers 35 of computer 30. The network as shown in FIG. 1 is for illustrative purposes only, and is not intended to limit the number of computers that can be connected to the network 40, i.e., any number of computers may be connected to the network 40.

Reference materials devoted primarily to this subject are available, such as *Computer Networks*, Third Edition (1996) by Andrew S. Tanenbaum, which is incorporated herein by reference. As defined in the aforementioned, a computer network is an interconnected collection of autonomous computers, such as internet and intranet systems, including local area networks (LANs), wide area networks (WANs), asynchronous transfer mode (ATM), ring or token ring, wired, wireless, satellite or other means for providing communication capability between separate processors. A computer is defined herein to include a device having both logic and memory functions for processing data, while computers or hosts connected to a network are said to be heterogeneous if they function according to different operating systems or communicate via different architectures.

Figure 2:
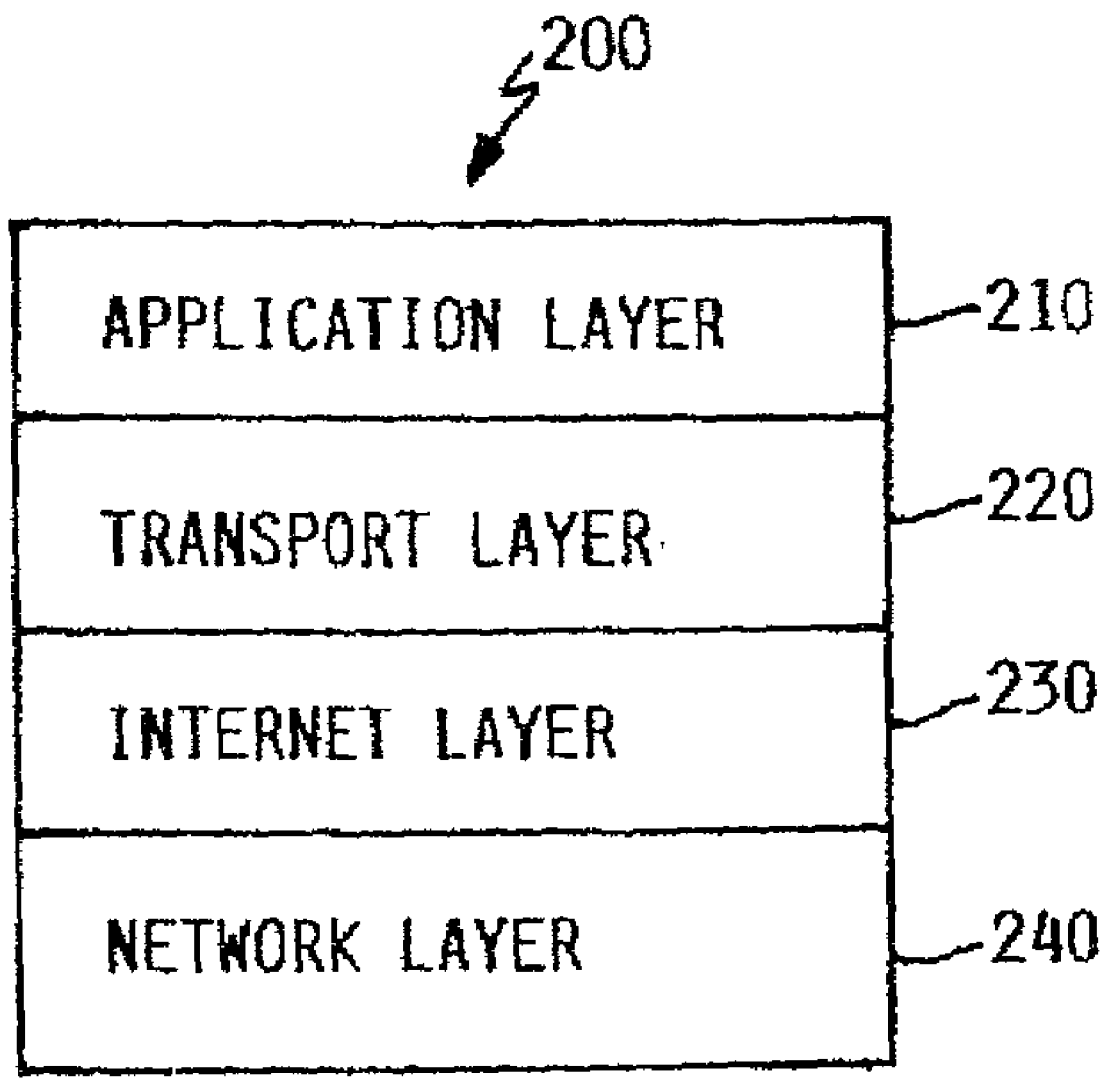
FIG. 2 illustrates a hierarchical structure of a data communication protocol.

Referring now to FIG. 2, a hierarchical structure 200 of a TCP/IP standard protocol is shown. The hierarchical structure 200 is a representation of the protocol layers 25 and 35. That is, an application layer 210 is shown as the highest layer with a transport layer 220 as the second highest and an Internet layer 230 as the third highest. The network layer 240 is shown as the lowest layer. The TCP/IP standard is used herein for illustrative purposes only. The embodiments of the present invention are not limited by any standard of layered software architecture, i.e., other layered software architecture standards may be used with the embodiments of the present invention.

Figure 3:
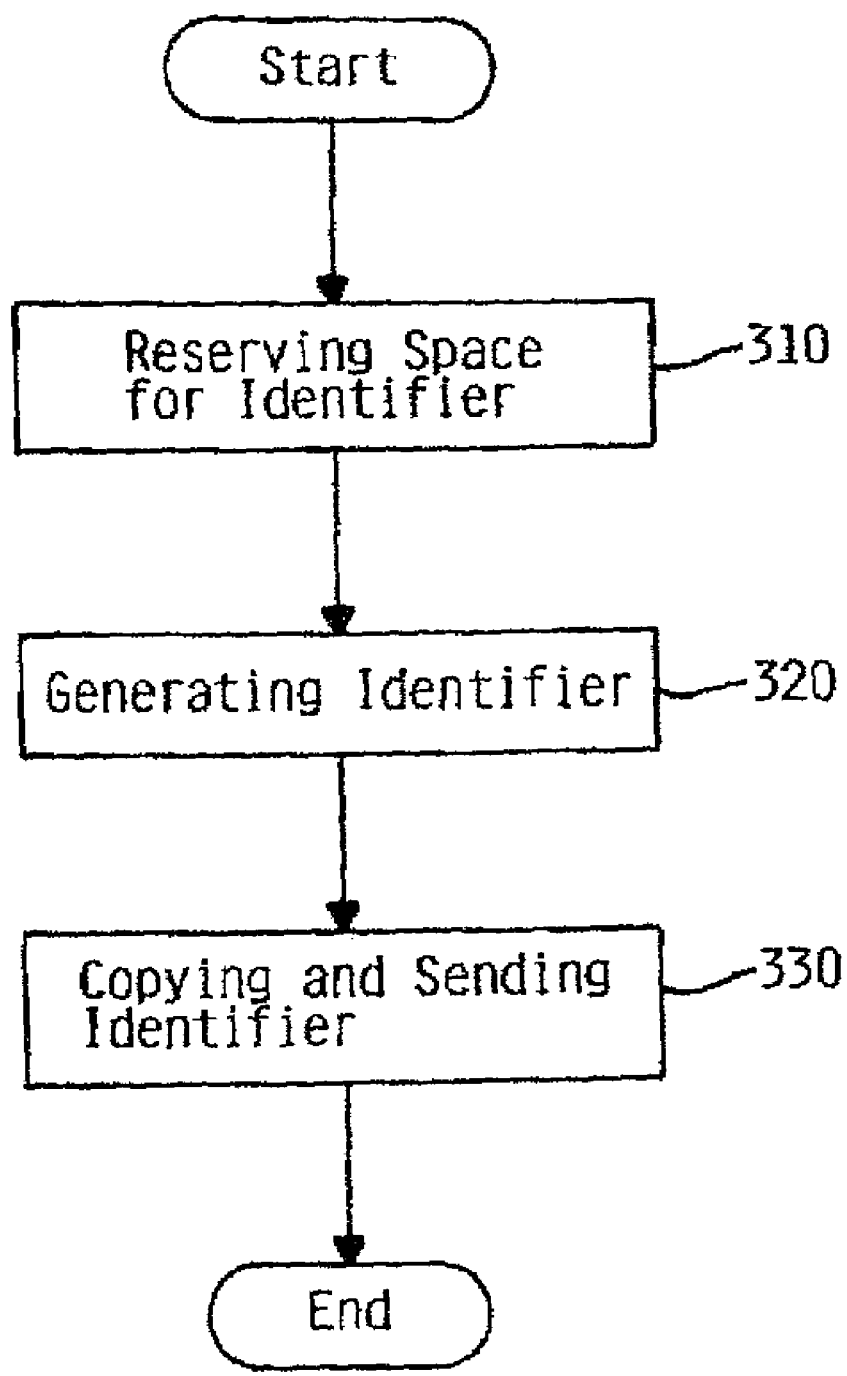
FIG. 3 is a block diagram illustrative of a method for assigning an identifier to data processed through one or more protocol layers of one or more computers over a network in accordance with an embodiment of the present invention.
Figure 4:
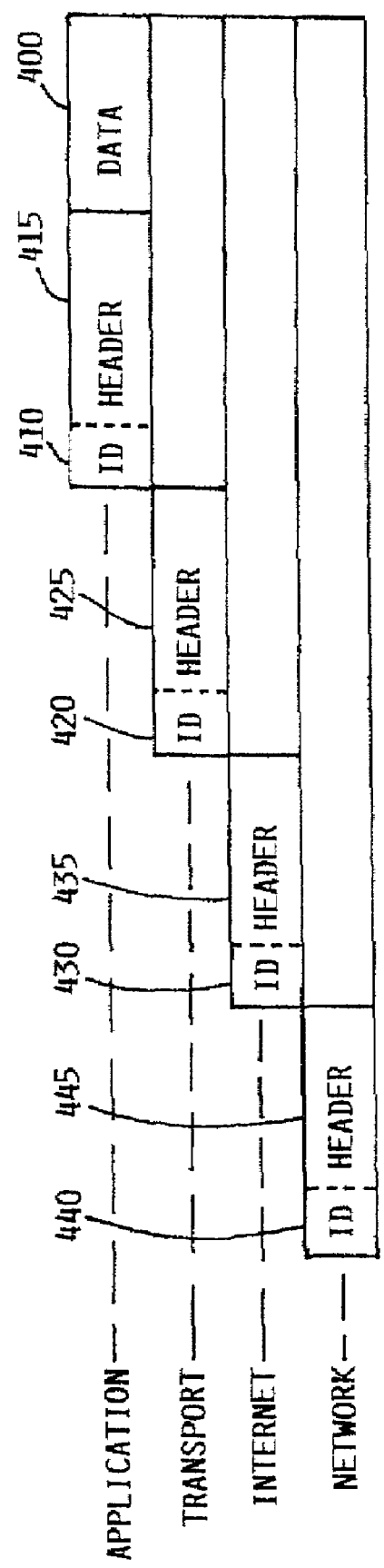
FIG. 4 illustrates a hierarchical structure of a data communication protocol in accordance with an embodiment of the present invention.

Referring now to FIG. 3, in accordance with an embodiment of the present invention, a block diagram illustrative of a method for assigning an identifier to data processed through one or more protocol layers of one or more computers over a network is shown. The method begins with block 310 in which a space is reserved for the identifier in the header of each protocol layer. In accordance with an embodiment of the present invention, a space is reserved at the header of each protocol layer in the sending computer, e.g., computer 20. Due to the layered software architecture, each protocol layer would have knowledge of the reserved space for the layer above it. In accordance with another embodiment of the present invention, the space is reserved at the header of each protocol layer in the sending computer after that header of that particular protocol layer is attached and prior to sending the data with that header to the lower protocol layer for further processing. For instance, using the TCP/IP standard protocol illustrated in FIGS. 2 and 4, the space 410 for the identifier is reserved at the header 415 of the application layer 210 after the header 415 that corresponds to the application layer 210 is attached to the data 400. Once the space 410 is reserved, the data 400 and the application layer header 415 are sent to the transport layer 220 for further processing. At the transport layer 220, a header 425 that corresponds to the transport layer 220 is attached to the data 400 and the application layer header 415. A space 420 is then reserved in that header 425 for the identifier. The data 400 along with the application and transport layer headers are then sent to the next lower layer, i.e., the Internet layer 230. At the Internet layer 230, a header 435 that corresponds to the Internet layer 230 is attached to the data 400, the application layer header 415 and the transport layer header 425. A space 430 is then reserved in that header 435 for the identifier. The data 400 along with the application, transport and Internet layer headers are then sent to the next lower layer, i.e., the network layer 240. At the network layer 240, a header 445 that corresponds to the network layer 240 is attached to the data 400, the application layer header 415, the transport layer header 425 and the Internet layer header 435. A space 440 is then reserved in the network layer header 445 for the identifier. In an embodiment of the present invention, the space that is reserved in the header is the first four bytes of that header. The identifier may also be stored in a data collection recorder, e.g., a flight recorder or a message buffer.

Referring to block 320 in FIG. 3, once a space is reserved in the header of each protocol layer, the identifier is generated. In accordance with an embodiment of the present invention, the identifier is generated at the layer that corresponds to the TCP/UDP layer. In accordance with another embodiment, the identifier is generated at a protocol layer in the sending computer, e.g., computer 20. At any rate, the identifier may be generated at any protocol layer in the sending computer. In an embodiment, the identifier is generated using a counter. In another embodiment, the identifier is based on a sliding window protocol. In yet another embodiment, the identifier is universally unique. That is, this identifier is distinct and different from identifiers that are generated at each protocol layer. Thus, in accordance with an embodiment of the invention, each header has two identifiers—the global identifier that is the same for the header in each protocol layer and an identifier that is generated by that particular protocol layer. In another embodiment, the identifier is unique within a window. In yet another embodiment, the identifier is 16 bits, which allows a 65,535-message window.

Once the identifier is generated, block 330 illustrates that the identifier is copied and stored in the space reserved in each header. In an embodiment, the identifier is stored at the header in the lowest protocol layer of the sending computer and then copied and sent to the rest of the protocol layers in the sending computer, beginning with the next higher layer. For instance, in accordance to the TCP/IP standard, the network layer 240 is the lowest layer, as shown in FIGS. 2 and 4. After the identifier is stored in the reserved space 440 of the network layer header 445, the identifier is copied and sent to the next higher layer, which is the Internet layer 230. The identifier is then stored in the reserved space 430 of the Internet layer header 435, and further copied and sent to the next higher layer, which is the transport layer 220. This process continues until the identifier is stored in the header of every layer, including the highest layer, of the sending computer. In accordance to the TCP/IP standard, for instance, the application layer 210 is the highest layer.

As previously explained, the receiving computer, e.g., computer 30, generally performs the converse of the above-described process, beginning with receiving the data and the headers of all the protocol layers at its lowest protocol layer. In accordance with an embodiment of the present invention, the header of the lowest protocol layer is removed and the identifier is copied from the reserved space in the header of the lowest protocol layer to the reserved space in the header of the next lowest layer. The data is then sent with the remaining headers to the next lowest layer. The header of the next lowest layer is then removed. This process continues until the identifier is stored in the reserved space of the header of each protocol layer of the receiving computer. For instance, using the TCP/IP standard shown in FIGS. 2 and 4, the network header 445 is first removed. The identifier is then copied from the reserved space 440 to the reserved space 430. The data 400 is then sent with application layer header 415, transport layer header 425 and Internet layer header 435 to the Internet layer 230. After the Internet layer header 435 is removed, the identifier is copied from the reserved space 430 to the reserved space 420. The data 400 is then sent with application layer header 415 and transport layer header 425 to the transport layer 220. After the transport layer header 425 is removed, the identifier is copied from the reserved space 420 to the reserved space 410. The data 400 is then sent with application layer header 415 to the application layer 220. At this point, a copy of the identifier has been stored in the header of each protocol layer of the sending computer and the receiving computer.

In accordance with an embodiment of the present invention, the identifier is used for tracing data as it is processed through the protocol layers. If data is lost in its transfer from a sending computer to a receiving computer, the data or message type along with the identifier can be traced from the application layer of the sending computer to track the process of the data along the protocol layers. The identifier, therefore, is particularly helpful when the sending computer transfers multiple data of the same type.

In accordance with another embodiment of the present invention, a code indicating whether the data was successfully sent from the sending computer to the receiving computer is copied and stored in the header of each protocol layer in the sending computer. In an embodiment, the code is generated at the lowest protocol layer of the sending computer when the data is successfully sent to the receiving computer over the network. Once generated, the code may be copied and passed to the next lowest protocol layer. The process continues until all the protocol layers of the sending computer receives the code as a notification that the data has been successfully sent. In accordance with another embodiment, data subject to the various embodiments of the present invention may either be sent asynchronously or synchronously.

While the foregoing is directed to embodiments of the present invention, other and further embodiments of the invention may be devised without departing from the basic scope thereof, and the scope thereof is determined by the claims that follow.

What is claimed is:

1. A method of sending data from a first computer to a second computer connected within a network, the first and second computers configured to send the data using a layered sequence of data communication protocols, the layered sequence of data communication protocols comprising at least a first protocol layer and a second protocol layer, the method comprising:
generating a first layer protocol data unit (PDU) by:
(a) attaching a first header to the data at the first protocol layer of the first computer; and
(b) reserving a space in the first header for an identifier;
sending the first layer PDU from the first protocol layer to the second protocol layer of the first computer;
generating a second layer PDU by:
(a) attaching a second header to the first layer PDU at the second protocol layer of the first computer;
(b) reserving a space in the second header for the identifier;
(c) generating the identifier at the second protocol layer; and
(d) storing the identifier in the reserved space of the second header and sending a copy of the identifier to the first protocol layer;
sending the second layer PDU from the second protocol layer of the first computer to its corresponding second protocol layer of the second computer over the network;
removing the second header from the second layer PDU at the second protocol layer of the second computer;
copying the identifier from the reserved space in the second header to the reserved space in the first header;
sending the first layer PDU from the second protocol layer of the second computer to the first protocol layer of the second computer; and
removing the first header from the first layer PDU at the first protocol layer of the second computer.

2. The method of claim 1, wherein the first protocol layer is the highest protocol layer of the layered sequence of data communication protocols.

3. The method of claim 1, wherein the second protocol layer is the lowest protocol layer of the layered sequence of data communication protocols.

4. The method of claim 1, wherein the identifier is generated using a counter.

5. The method of claim 1, further comprising sending a code from the second protocol layer of the first computer to the first protocol layer of the first computer, the code indicating whether the data was successfully sent from the second protocol layer of the first computer to its corresponding second protocol layer of the second computer.

6. The method of claim 1, wherein the space reserved for the identifier is the first four bytes of each header.

7. The method of claim 1, wherein, the identifier is returned to each of the plurality of protocol layers by returning a copy the identifier, successively, from the last protocol layer to each successive protocol layer.

8. A method of sending data from a computer to a network through a layered sequence of data communication protocol layers, the protocol layers comprising at least a first protocol layer and a second protocol layer, the method comprising:

generating a first layer protocol data unit (PDU) by:
  (a) attaching a first header to the data at the first protocol layer; and
  (b) reserving a space in the first header for an identifier;
sending the first layer PDU from the first protocol layer to the second protocol layer;
generating a second layer PDU by:
  (a) attaching a second header to the first layer PDU at the second protocol layer of the first computer;
  (b) reserving a space in the second header for the identifier;
  (c) generating the identifier at the second protocol layer; and
  (d) storing the identifier in the reserved space of the second header and sending a copy of the identifier to the first protocol layer;
sending the second layer PDU from the second protocol layer to the network.

9. A method of processing data for transmission to a remote computer using a data communications protocol stack that includes a plurality of protocol layers, the method comprising:
  beginning with a first protocol layer and for each successively lower layer of the protocol stack:
    (a) attaching a header associated with a current layer of the protocol stack to the data;
    (b) reserving a space in the header for an identifier; and
    (c) sending the data and attached header to the next successive layer in the protocol stack;
  additionally, at a lowest successive layer of the protocol stack:
    (a) generating the identifier; and
    (b) storing the identifier in the reserved space of the lowest successive layer of the protocol stack; and
    (c) returning a copy of the identifier to a previous layer of the protocol stack.

10. The method of claim 9, wherein the data communications protocol stack comprises the TCP/IP protocol stack, and a wherein the plurality of protocol layers include an application, transport, internet, and network layer.

11. The method of claim 9, further comprising,
  receiving, by a lowest protocol layer of the protocol stack at the remote computer, the data and headers;
  retrieving the identifier from the header associated with the lowest protocol layer;
  removing the header associated with the lowest protocol layer from the data;
  transmitting the data and the identifier to the next successively higher layer of the protocol stack,
  beginning with the next successively higher layer protocol layer and for each successively higher layer of the protocol stack:
    (a) removing a header from the data associated with a current protocol layer;
    (b) transmitting the data and the identifier to the next successively higher layer of the protocol stack.

* * * * *